United States Patent [19]

Hedler et al.

[11] 4,020,231

[45] Apr. 26, 1977

[54] PIGMENTED PHOSPHORS AND METHOD OF MAKING

[75] Inventors: Robert A. Hedler; W. Wentworth Slobbe, both of Seneca Falls, N.Y.

[73] Assignee: GTE Sylvania Incorporated, Stamford, Conn.

[22] Filed: Mar. 31, 1976

[21] Appl. No.: 672,249

[52] U.S. Cl. .......................... 428/403; 252/301.4 P; 252/301.4 F; 427/218; 427/219; 428/404

[51] Int. Cl.² ............... C09K 11/08; C09K 11/20; C09K 11/42

[58] Field of Search ............ 252/301.4 P, 301.4 R, 252/301.4 F, 301.6 R; 313/466, 468, 470, 473, 467, 474, 486; 427/68, 71, 73, 215, 216, 217, 218, 219; 428/403, 404

[56] References Cited

UNITED STATES PATENTS

| | | | |
|---|---|---|---|
| 2,774,682 | 12/1956 | Larach | 427/73 |
| 2,965,512 | 12/1960 | Umberger et al. | 428/403 |
| 3,114,065 | 12/1963 | Kaplan | 313/472 |
| 3,308,326 | 3/1967 | Kaplan | 427/106 |
| 3,548,237 | 12/1970 | Schreurs | 427/67 |
| 3,620,978 | 11/1971 | Moore | 427/215 |
| 3,875,449 | 4/1975 | Byler et al. | 313/468 |
| 3,886,394 | 5/1975 | Lipp | 313/473 |
| 3,887,753 | 6/1975 | Ninagawa et al. | 252/301.4 F |
| 3,927,240 | 12/1975 | Hammond et al. | 428/403 |

*Primary Examiner*—Ralph S. Kendall
*Assistant Examiner*—R. Eugene Varndell, Jr.
*Attorney, Agent, or Firm*—Norman J. O'Malley; William H. McNeill; Robert T. Orner

[57] ABSTRACT

A composite article comprises a core of a phosphor particle having a light modifying layer thereon. The light modifying layer is comprised of a co-precipitated mixture of a free-flowing agent such as silica or pyrophosphate and a pigment which modifies the light output of the energized phosphor. Also disclosed is a method of making the composite article which comprises the steps of preparing an aqueous mixture of particles of phosphor, particles of a pigment and a positively charged colloidal silica or pyrophosphate and mixing thoroughly. After mixing, a base, in the case of silica, or a salt which will form an insoluble pyrophosphate in the case of the pyrophosphate, is added thereto in sufficient amount to gel the mixture causing the silica or pyrophosphate and the pigment to co-precipitate upon and coat the phosphor particles. After the coating operation the supernatant liquid is removed and the coated phosphor is dried.

14 Claims, No Drawings

PIGMENTED PHOSPHORS AND METHOD OF MAKING

BACKGROUND OF THE INVENTION

This invention relates to phosphors and more particularly to phosphors having a light modifying layer thereon. These phosphors can be used, for example, on the image screen of cathode ray tubes, in particular the image screen of color cathode ray tubes and, when so used, they also increase the contrast of the tubes. Phosphors are known classes of materials which have the property of emitting radiation in the form of light when bombarded by a suitable form of energy such, for example, as the electron rays generated in a cathode ray tube.

In a color cathode ray tube, for example, the image screen is provided with a discrete pattern of phosphors emissive of the three primary colors: red, green, and blue. As used generally in the art and particularly in this specification, a phosphor referred to by a color will mean the light emitted by the phosphor as opposed to its body color.

While it would be advantageous if these phosphors were line emitters, typically they are not. For example, a red phosphor will typically emit radiation over a frequency range wherein the net overall effect to a subjective observer will be red. However, there will be extraneous unwanted emission points and frequencies within the spectrum which may or may not detract from the overall perception of the phosphor. For example, some red phosphors have emission peaks within the orange portion of the spectrum which greatly enhance the brightness characteristics of the phosphor but tend to detract from the so called "ideal" red color desired. Likewise, the blue and green phosphors emit over a frequency range containing desired and undesired frequencies.

The art has been aware of these problems for many years and frequent attempts have been made to obviate these problems. For example, it has been suggested that appropriate filters may be placed in front of the discrete phosphors to absorb or attenuate the undesired frequencies while passing the desired ones. This approach has proven to be very expensive and very difficult to achieve. More recently it has been suggested to apply a filter material to the phosphor particles themselves. This approach has been detailed recently in such U.S. Pats. as Nos. 3,875,449; 3,308,326; and 3,886,394. Each of these prior patents discloses various means for accomplishing the application of a filter material to the phosphor particle. However, each of them is accompanied by difficulties in application and in uniformity or in the agglomeration of the phosphor particles which makes them difficult to apply to the screen area of a cathode ray tube.

It would therefore be an advance in the art if means of obviating the problems of the prior art could be accomplished.

OBJECTS AND SUMMARY OF THE INVENTION

It is therefore an object of this invention to obviate the disadvantages of the prior art.

It is yet another object of the invention to provide a uniquely pigmented phosphor having an appropriate color filter applied thereto.

It is yet another object of the invention to provide a method for making such phosphors.

Still another object of the invention is the provision of a method of making free-flowing pigmented phosphors.

These objects are accomplished in one aspect of the invention by providing a composite article which has a core of a phosphor particle having the capability of emitting light in a relatively narrow frequency band which contains a preferred frequency and other frequencies. The core of the particle is encapsulated by a light modifying layer which layer comprises a co-precipitated mixture of a free-flowing agent, such as a material selected from the group consisting essentially of silica and pyrophosphates and a pigment. The pigment is substantially transparent to light of the preferred frequency and substantially opaque to light of the other frequencies.

A method of making these free-flowing pigmented phosphors comprises the steps of preparing an aqueous mixture of particles of phosphors, particles of a pigment and, for example, a positively charged colloidal silica. This mixture is mixed thoroughly and under continued agitation. Then, a base in a sufficient amount to gel the mixture is added. As the mixture gels the silica and pigment are co-precipitated out on and coat the phosphor particles. After sufficient period of time to allow coating, the phosphor settles out and the supernatant liquid is removed. Thereafter the phosphor is dried.

This unique process provides a novel pigmented phosphor. The light modifying layer which is comprised of the co-precipitated silica and pigment provides a very free-flowing non-agglomerated phosphor. The method is relatively simple and inexpensive to employ and provides this unique phosphor in a scale well suited to the mass production techniques of the industry.

When a pyrophosphate-pigment coating is desired, the pryophosphate is added instead of the silica and precipitation is initiated by the addition of a salt which will form an insoluble pyrophosphate. A suitable salt is magnesium chloride.

DESCRIPTION OF THE PREFERRED EMBODIMENTS

For a better understanding of the present invention together with other and further objects, advantages, and capabilities thereof, reference is made to the following disclosure and appended claims.

Referring to the invention with greater particularity, a composite article comprises a core of a phosphor particle which has the capability of emitting light in a relatively narrow frequency band which contains a preferred frequency and other frequencies. The light emission from the particle is stimulated by bombardment with a suitable form of energy. This energy can be ultraviolet radiation or electron stimulation from a beam of electrons, such as is employed in a cathode ray tube. The phosphor can be any of the commercially employed phosphors such as those commonly known as the red, green, and blue emitting phosphors employed in color cathode ray tubes. The core or phosphor particle is encapsulated by a light modifying layer which can also enhance the contrast thereof when used in a color picture tube. This layer is composed of a co-precipitated mixture of a free-flowing agent such as a material selected from the group consisting essentially of silica and pyrophosphates and a pigment which is substantially transparent to light of the preferred phosphor frequency and substantially opaque to light of the other emitted frequencies.

The pigment material itself can be selected from any of the known suitable pigmentation materials. For example, a suitable pigment for a red-emitting phosphor can be cadmium sulfoselenide or a ferric oxide ($Fe_2O_3$). When it is desired to apply a pigment to a blue phosphor, materials such as commercial cobalt blues or ultramarine blue can be employed. When the phosphor being worked upon is a green emitting phosphor a chromium oxide ($Cr_2O_3$) or commercial cobalt chrome greens can be employed.

While there are a number of silica or pyrophosphate compounds that could be employed it has been found that a positively charged medium provides a tremendous advance in the art. A suitable positively charged colloidal silica has been found to be Ludox 130M which is avaiable from the Dupont Corporation. This positively charged colloidal silica readily adheres to the phosphor core and carries with it the desired pigment in a process characterized by the co-precipitation of the silica and pigment upon the phosphor.

The phosphor thus produced has all of the advantages of pigmented phosphors in addition to being provided with the desirable free-flowing characteristics necessary to its proper application on a cathode ray tube screen.

These free-flowing phosphors with the suitable pigment thereon are prepared by a process which comprises the steps of first preparing an aqueous mixture of particles of the phosphor together with particles of the pigment and a free-flowing agent and mixing thoroughly. After thorough mixing, a precipitation causing agent is added in a sufficient amount to cause the free-flowing agent and the pigment to co-precipitate upon and coat the phosphor particles. After a suitable period of time, the phosphor will settle from the mixture and the supernatant liquid is removed, as by filtering, and the now coated phosphor is dried.

When a positively charged colloidal silica is employed as the free-flowing agent, the preciptiation causing agent used is a base, such as a dilute ammonium hydroxide (e.g., a 3% solution).

When a pyrophosphate is employed as the free-flowing agent, the precipitation causing agent is a salt which will form an insoluble pyrophosphate. Such a salt can be magnesium chloride.

It is also possible to first form a thick paste by milling a suitable pigment with water for a period of 2–4 hours. After suitable milling the pigment-water paste is diluted by the addition of more water and then the free-flowing agent and phosphor are added.

As a specific example, 100 grams of a standard yttrium oxide red phosphor was mixed with 5 grams of a cadmium sulfoselenide pigment in 200 ml of deionized water. A suitable cadmium sulfoselenide is one available from the General Color Corporation under the tradename Red Toner No. 2010. After suitable mixing there was added to the phosphor-pigment mixture 1.1 ml of a positively charged colloidal silica such as the Ludox 130M previously mentioned. Again, after suitable mixing, dilute ammonium hydroxide was added to raise the pH to 9 which causes the colloidal silica to gel and precipitate upon the phosphor carrying with it the pigment. After a suitable time period for allowing the phosphor to be coated and to settle from the mixture the supernatant liquid is removed, such as by filtration, and the phosphor dried. This process can produce a phosphor having a brightness of about 85% of the brightness of the uncoated phosphor particle.

It shall be understood that any coating procedure of this type wherein a material is applied to a phosphor particle will inherently reduce the brightness of the phosphor to some extent. In all coating procedures of this type the amount of material to be deposited will of necessity be a subjective determination of how much color enhancement is desired at what penalty of brightness loss. The size of the materials being employed will also have a bearing upon this. It has been found that when the phosphor particles have an average size of 6 to 7 microns, then a suitable coating can be achieved using particles having diameters up to 1 micron.

Employing the processes herein described provides a unique phosphor particle having a desired pigmentation thereon for modifying the normal light output of the phosphor and additionally providing the phosphor with a very desired free-flowing characteristic.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A method of making free-flowing, pigmented phosphor comprising the steps of: preparing an aqueous mixture of particles of phosphor, particles of a pigment and a free-flowing agent and mixing thoroughly; adding a precipitation causing agent in sufficient amount to cause said free-flowing agent and said pigment to co-precipitate upon and coat said phosphor; allowing said now coated phosphor to settle; removing the supernatant liquid; and drying said coated phosphor.

2. The method of claim 1 wherein said supernatant liquid is removed by filtration.

3. The method of claim 1 wherein said free-flowing agent is selected from the group consisting essentially of positively charged colloidal silicas and pyrophosphates.

4. The method of claim 3 wherein said free-flowing agent is a positively charged colloidal silica and said precipitation causing agent is a base.

5. The method of claim 4 wherein said base is ammonium hydroxide.

6. The method of claim 5 wherein said sufficient amount raises the pH to about 9.

7. The method of claim 6 wherein said aqueous mixture is prepared by the steps of: preparing a first mixture of said phosphor particles and said pigment particles in deionized water; and adding thereto said free-flowing agent.

8. The method of claim 7 wherein said aqueous mixture is prepared by the steps of: milling said pigment with deionized water to form a thick paste; diluting said pigment and water by the addition of more water; adding said free-flowing agent and continuing to mix; and subsequently adding said phosphor.

9. The method of claim 8 wherein said aqueous mixture comprises proportions of: about 100 gm of said phosphor to about 5 gm of said pigment to about 200 ml of deionized water to about 1.1 ml of said colloidal silica.

10. The method of claim 3 wherein said free-flowing agent is a pyrophosphate.

11. The method of claim 10 wherein said precipitation causing agent is a salt which will form an insoluble pyrophosphate.

12. The method of claim 11 wherein said salt is magnesium chloride.

13. A composite article comprising: a core of a phosphor particle having the capability of emitting light in a relatively narrow frequency band containing a preferred frequency and other frequencies when excited by a suitable form of energy; said core being encapsulated by a light modifying layer; said layer being composed of a co-precipitated mixture of a material selected from the group consisting essentially of silica or pyrophosphate and a pigment which is substantially transparent to light of said preferred frequency and substantially opaque to light of said other frequencies.

14. The article of claim 13 wherein said coated phosphor has an excited brightness of about 85% of the uncoated phosphor.

* * * * *